United States Patent [19]

Jones

[11] Patent Number: 4,976,669

[45] Date of Patent: Dec. 11, 1990

[54] DUAL OUTPUT PLANETARY GEAR SYSTEM

[75] Inventor: John F. Jones, Berkley, Mich.

[73] Assignee: Williams International Corporation, Walled Lake, Mich.

[21] Appl. No.: 382,314

[22] Filed: Jul. 20, 1989

[51] Int. Cl.$^5$ .............................................. F16H 37/06
[52] U.S. Cl. ...................................... 475/248; 475/332
[58] Field of Search ...................... 475/89, 90, 91, 248, 475/332

[56] References Cited

U.S. PATENT DOCUMENTS

| | | | |
|---|---|---|---|
| 1,434,620 | 11/1922 | McCain | 475/248 |
| 2,228,638 | 1/1941 | Mercier | 475/248 |
| 2,531,032 | 11/1950 | Desmonlius | 475/248 |
| 2,978,929 | 4/1961 | Roberts | 475/89 |
| 4,183,265 | 1/1980 | Pauley | 475/91 |
| 4,519,272 | 5/1985 | Meier | 475/89 |
| 4,712,448 | 12/1987 | Lanzer | 475/89 |
| 4,729,259 | 3/1988 | Lanzer | 475/89 |
| 4,729,262 | 3/1988 | Lanzer | 475/91 |
| 4,747,464 | 5/1988 | Lanzer | 475/91 |

*Primary Examiner*—Dirk Wright
*Attorney, Agent, or Firm*—Lyon & Delevie

[57] ABSTRACT

A gear system for driving a pair of rotary loads, such as a pair of helicopter rotors operating in ambient air, with a single rotary input comprises a planetary gear train, the sun gear of which is driven by the rotary input, and the planetary gear carrier and annulus gear of which respectively drive the loads via output shafts coupled thereto by suitable first and second coupling means, respectively. Where rotary outputs of substantially equal torque are desired, as where the rotors are of like dimension, one of the output couplings further comprises speed-reduction gearing and/or means for driving an auxiliary unit with the second output. An idler gear is further employed where the rotors are to rotate in opposite directions.

5 Claims, 2 Drawing Sheets

DUAL OUTPUT PLANETARY GEAR SYSTEM

BACKGROUND OF THE INVENTION

The instant invention relates to a gear system which utilizes a planetary gear train to provide a pair of rotary outputs from a single rotary input. More specifically, the instant invention is directed to a gear system for driving a pair of similarly loaded output shafts with a single rotary input, as where a pair of like helicopter rotors are to be driven with equal torque at approximately the same speed by a single power plant.

Planetary gear trains are known both for their compact size and their ability to produce a constant torque output of varying rotational speed from a first rotary input through the use of a second, controlling input. More specifically, typical planetary gear trains comprise three members rotatable about a common axis, those members being a sun gear, an annulus gear, and a planetary gear carrier. The planetary gear carrier supports a plurality of planetary gears, each of which meshes with both the sun and annulus gear of the gear train. Two of the members, e.g., the sun and annulus gears, are driven or otherwise controlled by the two rotary inputs to the gear train. The remaining gear train member, e.g., the planetary gear carrier, rotates at a speed and in a direction dictated by the rotational speed and direction of the two inputs, thus providing the lone output from the gear train. It is noted that, in this respect, one of the inputs frequently comprises a fixed, non-rotating input, or a variable-speed input, as may be obtained, for example, by connecting a brake or clutch to one of the input members.

Unfortunately, the prior art fails to teach a gear system which incorporates the advantages of planetary gear trains while providing a pair of rotary outputs from a single rotary input.

SUMMARY OF THE INVENTION

It is an object of the instant invention to provide a gear system employing a planetary gear train to produce a pair of rotary outputs from a single rotary input.

Another object of the instant invention is to provide a gear system employing a planetary gear train to produce a pair of rotary outputs for driving substantially similar loads with a single rotary input.

A further object of the instant invention is to provide a gear system employing a planetary gear train to produce a pair of rotary outputs for driving a pair of like helicopter rotors in opposite directions with substantially equal torque using a single rotary input.

Yet another object of the instant invention is to provide a dual output planetary gear system for driving a pair of like helicopter rotors with substantially equal torque, one of the outputs further serving to drive an auxiliary unit, such as an oil pump.

The instant gear system for driving a pair of loaded output shafts with a single rotary input comprises a planetary gear train having three members rotatable about a common axis, the three members being a sun gear, an annulus gear and a planetary gear carrier supporting at least one planetary gear, with the planetary gear meshing with both the sun and annulus gears, respectively. The instant gear system further comprises means for driving one of the gear train members, e.g., the sun gear, with the rotary input; and first and second means for coupling the two remaining gear train members, e.g., the planetary gear carrier and the annulus gear, to the first and second output shaft, respectively.

Where desired, the torques of the two outputs are made substantially equal by including speed reduction means in either the first or second coupling means, as by driving one of the output shafts via a speed reduction gear train comprising, for example, a pair of gears whose dissimilar pitch diameters have been calculated in a manner known to those skilled in the art to offset the inherently dissimilar torque outputs of the two output members of the planetary gear train. An idler gear couples the two speed-reducing gears in those instances where the output shafts are to rotate in opposite directions.

Alternatively, the inherently disparate output torques of the planetary gear train are equalized, in whole or in part, by driving an auxiliary unit, such as an oil pump, with one of the outputs therefrom. For example, where an idler gear is used to provide oppositely-rotating output shafts, the oil pump may be directly coupled with the idler gear to drive same. Where required, speed-reduction gearing is also employed to precisely match the torques applied to the rotors.

BRIEF DESCRIPTION OF THE DRAWINGS

FIG. 4 is diagrammatic schematic of a gear system similar to that shown in FIGS. 1 and 2 wherein the torque on the output shafts thereof are equalized in part by driving an oil pump with the idler gear, and in part through the use of speed-reduction gearing.

DETAILED DESCRIPTION OF THE PREFERRED EMBODIMENT OF THE INVENTION

Figure 1:
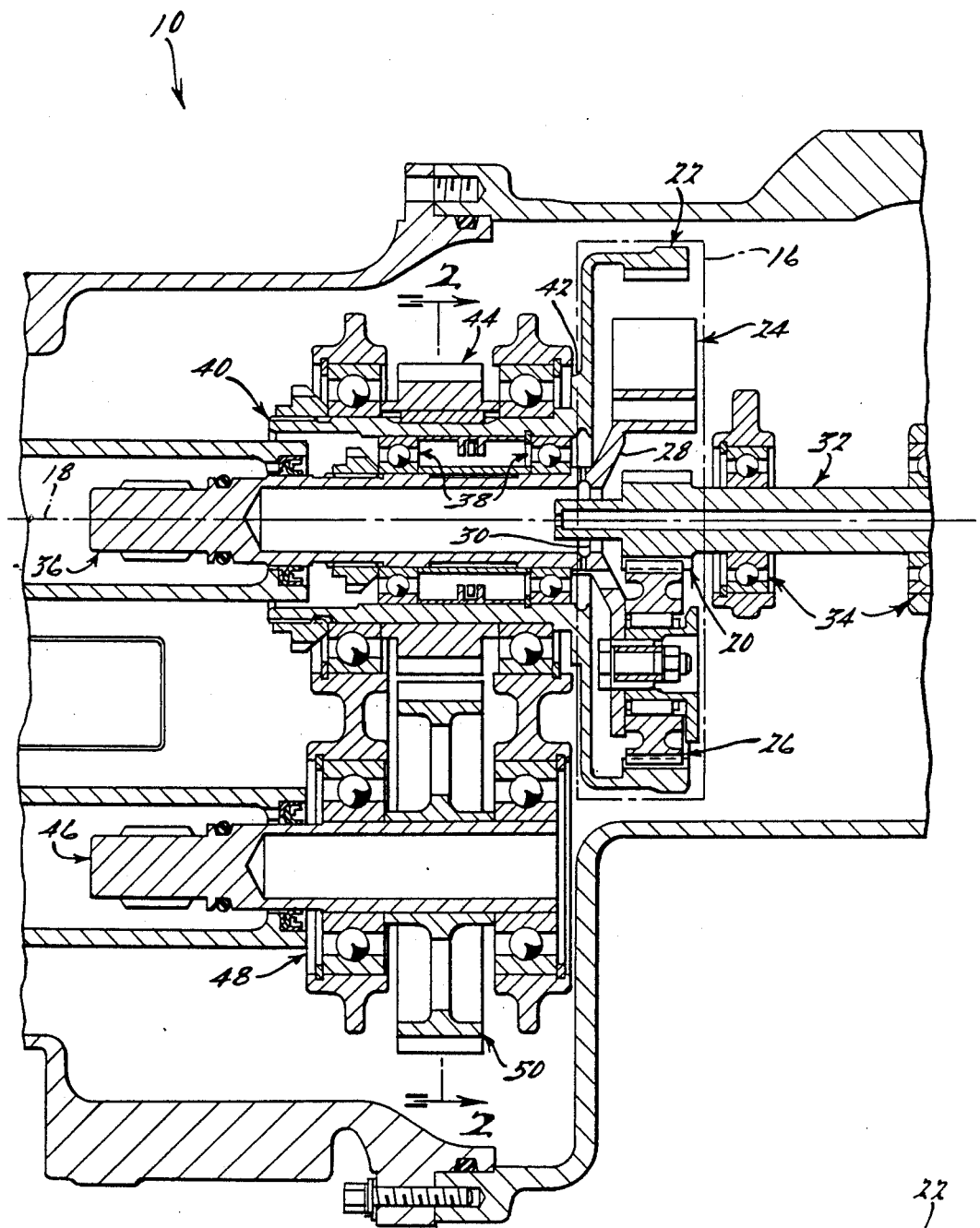
FIG. 1 is a side view in cross-section of an exemplary embodiment of the instant gear system for producing a pair of like rotary outputs from a single input when driving substantially equal loads.
Figure 2:
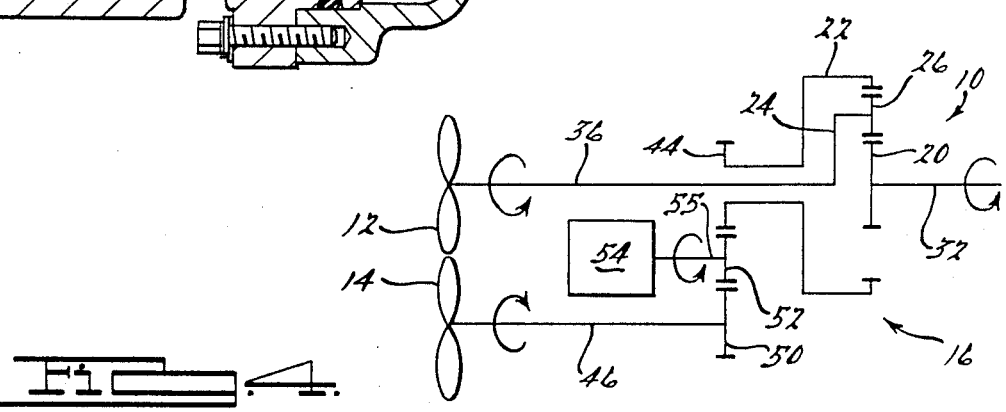
FIG. 2 is a partial view in cross-section of the gear system of FIG. 1 along the line 2—2 thereof to show the idler gear meshing simultaneously with the speed-reducing gears employed therein.
Figure 2:
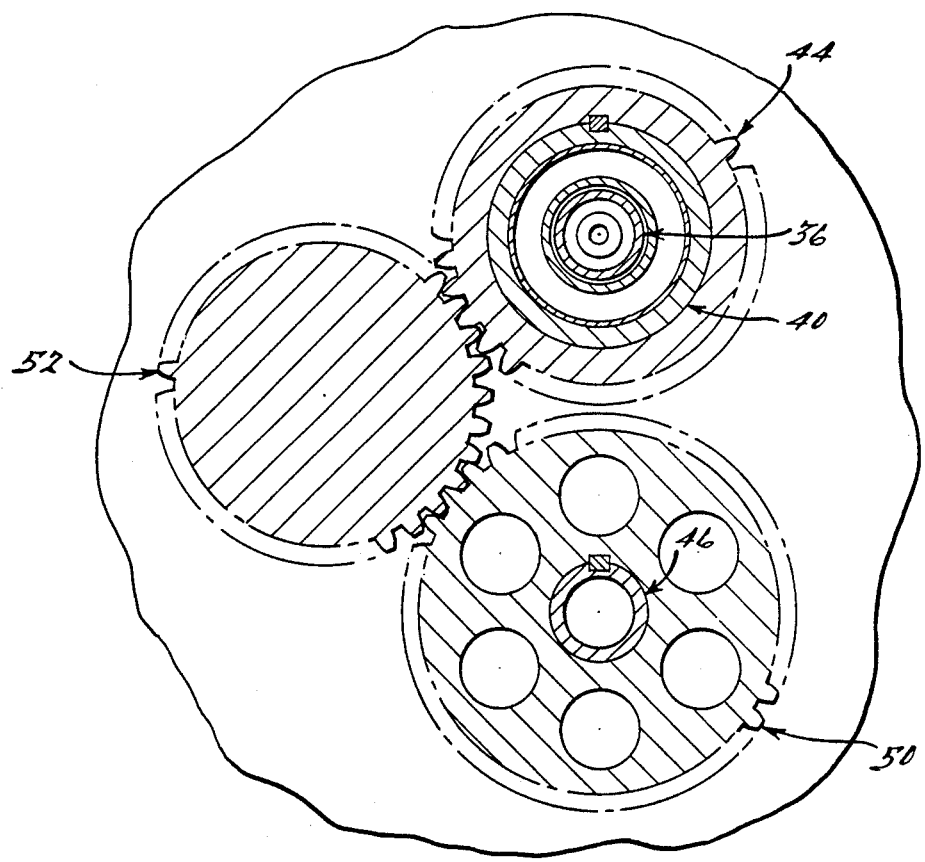

An exemplary embodiment of the instant gear system 10 for driving a pair of like helicopter rotors 12 and 14 in opposite directions with substantially equal torque using a single rotary input is illustrated in FIGS. 1 and 2. Specifically, the instant gear system 10 comprises a planetary gear train 16 having three members rotatable about a common axis 18, those members being a sun gear 20, an annulus gear 22, and a planetary gear carrier 24. The planetary gear carrier 24 supports three planetary gears 26 on a like number of arms 28 extending radially outwardly from its central hub 30. The planetary gears 26 are mounted on the carrier arms 28 so as to mesh simultaneously with both the sun gear 20 and annulus gear 22.

The sun gear 20 is driven by a rotary input, as might be generated by a gas turbine engine (not shown), via input shaft 32 located coaxially therewith by bearings 34.

Figure 3:
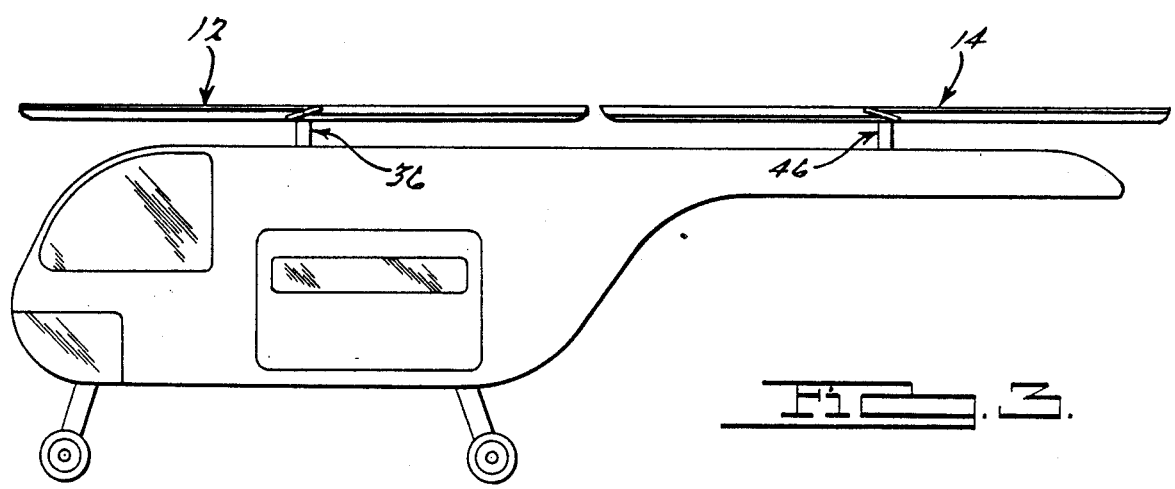
FIG. 3 is a view in elevation of a dual-rotor helicopter, the rotors of which are of like dimension and are driven in opposite directions with substantially equal torque using a single rotary input and the gear system of FIG. 1.

A first output shaft 36 is located coaxially with the planetary gear carrier 24 by bearings 38. The planetary gear carrier 24 is coupled to the shaft 36 as by directly attaching its hub 30 thereto. Thus, the planetary gear carrier 24 drives the first output shaft 36 which, in turn, drives the first rotor 12 of the helicopter illustrated in FIG. 3.

An annular sleeve 40 is located concentrically about the first output shaft 36, as seen in FIG. 1. The annulus gear 22 is coupled to the sleeve 40 as by directly attaching its hub 42 thereto. A spur gear 44, which forms the first of a pair of speed-reducing gears, is mounted on the sleeve 40.

A second output shaft 46 is located substantially parallel to the first output shaft 36 by bearings 48. The second speed-reducing spur gear (hereinafter "output gear 50") is mounted on the second output shaft 46 so as to be axially aligned with the gear 44 on sleeve 40. Referring to FIG. 2, an idler gear 52 meshes simultaneously with speed-reducing gears 44 and 50 to complete the couple between the annulus gear 22 and the second output shaft 46. The idler gear 52 ensures that the second output shaft rotates in the same direction as the annulus gear, whereby the rotor 14 driven by the second output shaft rotates in the opposite direction as the first rotor 12.

It will be readily appreciated that the gear 44 on the sleeve 40 may directly mesh with the output gear 50 in the event that both output shafts 36 and 46 and, hence, both rotors 12 and 14 are to rotate in the same direction. It will also be readily appreciated that the instant invention contemplates the use of helical gears in place of spur gears 44, 50, and 52, where desired.

The pitch diameter of output gear 50 is adjusted relative to that of gear 44 to provide speed reduction for the second output of the instant gear system 10, whereby the inherently dissimilar output torques of annulus gear 22 and planetary gear carrier 24 are equalized. Specifically, the ratio of the pitch diameter of output gear 50 to that of gear 44 equals the ratio of the sum of the numbers of teeth in the annulus gear 22 and on the sun gear 20 to the number of teeth in the annulus gear 22. This gear combination equalizes the output torques on the shafts 36 and 46 notwithstanding variations in the relative rotational speeds of the output shafts 36 and 46.

In accordance with another feature of the instant invention, FIG. 4 shows the inherently dissimilar torques of the two planetary gear train output members 22 and 24 being equalized, in part, by driving an auxiliary unit, such as an oil pump 54, with one of the output members. Specifically, the oil pump 54 is coupled to and, hence, driven by the idler gear 52 of the instant gear system 10 by a third output shaft 55. Gears 44 and 50 provide additional speed-reduction/torque multiplication, whereby the torques ultimately exerted on the rotors 12 and 14 by their respective shafts 36 and 46 are equalized.

It will be appreciated that, under the instant invention, where a fixed torque ratio other than unity is desired, the speed reduction and corresponding torque multiplication achieved by the speed-reducing gears 44 and 50 is altered as by adjusting the pitch diameters thereof to provide the desired torque split between the two output shafts 36 and 46, respectively.

While the preferred embodiment of the invention has been disclosed, it should be appreciated that the invention is susceptible of modification without departing from the spirit of the invention or the scope of the subjoined claims.

I claim:

1. A gear system for driving a first and second rotor with a rotary input, said rotors being of like dimension and operating in a common medium, said gear system comprising:

a planetary gear train coaxially comprising a sun gear, an annulus gear, and a planetary gear carrier having at least one planetary gear mounted thereon, the planetary gear meshing simultaneously with the sun gear and the annulus gear;

means for driving the sun gear with said rotary input;

first means for coupling the carrier to said first rotor, said first coupling means including a first output shaft located coaxially with the carrier of said planetary gear train and attached thereto; and second means for coupling the annulus gear to said second rotor, said second coupling means including an annular sleeve located concentrically about said first output shaft and attached to said annulus gear;

a pinion gear mounted on said annular sleeve;

a second output shaft located substantially parallel to said first output shaft;

an output gear mounted on said second output shaft; and an idler gear meshing simultaneously with said pinion gear and said output gear, respectively.

2. The gear system of claim 1 wherein the ratio of the pitch diameter of said output gear to that of said pinion gear equals the ratio of the sum of the numbers of teeth in the annulus gear and the sun gear of the planetary gear set to the number of teeth in the annulus gear of the planetary set.

3. The gear system of claim 1 including a third output shaft coupled to said idler gear, said third output shaft driving a rotary load of substantially fixed rotational resistance.

4. A gear system for driving a first and second output shaft with a single rotary input, said gear system comprising a planetary gear train comprising three members rotatable about a common axis, said three members being a sun gear, an annulus gear, and a planetary gear carrier having at least one planetary gear mounted thereon, the planetary gear meshing simultaneously with the sun gear and the annulus gear;

means for driving a first one of said three members with said rotary input;

first means for coupling the first output shaft with a second one of said three members; and second means for coupling the second output shaft with the remaining one of said three members, said second coupling means including means for driving a third output shaft with said second one of said three members, said third shaft driving a rotary load of substantially fixed resistance such that said first and second output shafts are driven with substantially equal torque.

5. A gear system for driving a first and second rotor with a rotary input, said gear system comprising a planetary gear train coaxially comprising a sun gear, an annulus gear, and a planetary gear carrier having at least one planetary gear mounted thereon, the planetary gear meshing simultaneously with the sun gear and the annulus gear;

means for driving the sun gear with said rotary input;

first means for coupling the carrier to said first rotor; and second means for coupling the annulus gear to said second rotor, said second coupling means including means for driving a third output shaft with the carrier of said planetary gear train, said third shaft driving a rotary load of substantially fixed resistance.

* * * * *